United States Patent [19]

Norcross

[11] Patent Number: 4,499,978
[45] Date of Patent: Feb. 19, 1985

[54] SLACK ADJUSTER

[75] Inventor: Charles E. Norcross, Macomb, Ill.

[73] Assignee: C. S. Norcross & Sons, Vernoa, Pa.

[21] Appl. No.: 482,922

[22] Filed: Apr. 7, 1983

Related U.S. Application Data

[63] Continuation-in-part of Ser. No. 319,216, Nov. 9, 1981, abandoned.

[51] Int. Cl.³ .............................................. F16D 65/46
[52] U.S. Cl. ............................ 188/79.5 K; 188/196 M
[58] Field of Search ................... 74/522; 188/79.5 K, 188/196 M

[56] References Cited

U.S. PATENT DOCUMENTS

| | | | |
|---|---|---|---|
| 2,012,011 | 8/1935 | Keller | 188/196 |
| 2,109,637 | 3/1938 | Gutkaiss | 188/79.5 K X |
| 2,294,974 | 9/1942 | Freeman | 188/79.5 K |
| 2,347,186 | 4/1944 | Freeman | 74/522 |
| 2,348,734 | 5/1944 | Freeman | 74/522 |
| 3,949,840 | 4/1976 | Cumming et al. | 188/79.5 K |

FOREIGN PATENT DOCUMENTS

| | | |
|---|---|---|
| 669379 | 8/1963 | Canada . |
| 1926092 | 5/1969 | Fed. Rep. of Germany . |
| 1189319 | 4/1970 | United Kingdom . |

Primary Examiner—Duane A. Reger
Attorney, Agent, or Firm—Niro, Jager & Scavone

[57] ABSTRACT

A strong and lightweight adjustable slack adjuster is disclosed. The slack adjuster body portion includes, in one form thereof, an integral and a removable cover plate. In another form a pair of removable side cover plates are provided and are fixed to the slack body by deformation of a body rim over the cover plate edge. Other cover plate forms are deformable or resilient and include peripheral skirts which are expandable radially outwardly to fit within an annular groove in the body portion. Meshing worm gear and worm wheel means, which can be rotatably adjusted with respect to each other to thereby adjust the slack in a braking system, are positioned within the body. The worm wheel is supported by the body around its entire periphery to maximize the load carrying capacity of the slack while minimizing wear. The major portion of the worm gear is also supported by the body. Sealing means are positioned between the worm wheel and the cover plates to seal the worm gear and worm wheel from contaminants. A removable cover cap is also provided to protect the adjusting mechanism from damaging contaminants and corrosion. The components also can be treated with corrosion-resistant material.

25 Claims, 17 Drawing Figures

FIG. 16

SLACK ADJUSTER

CROSS REFERENCE TO RELATED APPLICATIONS

This application is a continuation-in-part of a U.S. application Ser. No. 319,216, filed Nov. 9, 1981 now abandoned.

BACKGROUND AND GENERAL DESCRIPTION

This invention relates to a mechanism for taking up slack in a vehicle brake system and more particularly relates to a brake slack adjuster which embodies an improved strong and lightweight construction.

Slack adjusters are an integral part of the linkage mechanism for the brake systems on heavy duty vehicles, such as trucks and buses. In the usual arrangement, a slack adjuster is provided for most wheels of a heavy duty vehicle on the shaft through which braking force is applied to the wheel. The slack adjuster responds to the movement of the brake linkage, caused by the application of a force to the braking pedal by the operator, to rotate the brake shaft and thereby apply a braking force through the brake shoes and drum for each wheel.

It is apparent that the slack adjuster is an important element in a vehicle braking system. It must be designed to have substantial strength and durability so that it will repeatedly perform its functions without fail, over a prolonged period of time. At the same time, the slack adjuster must be as lightweight as possible, so that the mechanism does not add unnecessary cost and weight to the brake system and vehicle. Most significant, the dual design requirements of sufficient strength and minimum weight must be met to allow slack adjusters to be provided for an economical cost, and with economical manufacturing techniques, on a high volume, mass production basis.

In addition to effectively transmitting a braking force through the braking system, the slack adjusters must also be readily adjustable. This adjustment feature is necessary to provide the braking system with a mechanism for taking up the slack in the linkage which inevitably results from repeated applications of the brakes in a heavy duty vehicle. The slack adjuster design therefore must provide a solid connection in the brake linkage during normal use and, at the same time, be readily adjustable on the vehicle by a mechanic, with the use of simple and readily available tools.

The environment in which the brake slack adjuster is used also creates substantial design and operation problems. Since a slack adjuster is mounted adjacent the axle housing on heavy duty vehicles, the adjuster is exposed to extreme environmental conditions. The adjuster is subjected to substantial temperature variations, and must continue to function properly in adverse environments such as rain, snow and ice. In addition, the slack adjuster is constantly bombarded by foreign matter such as stones, dirt, mud and salt water which is thrown up from the road by the moving vehicle. Thus, the adjuster must be able to perform its functions of transferring braking force from the brake pedal to the brake shoes and drum while being continuously adjustable despite these extreme environmental conditions. The adjuster also should include means for protecting the mechanism from this adverse environment without the adjustment functions.

The slack adjuster of the present invention alleviates many of the foregoing problems. The present slack adjuster can be forged from high strength steel with a minimum amount of material. The adjuster also is forged to have, in one form, an integral cover plate which eliminates the need for an additional cover plate part. An integral cover plate also improves the operation of the mechanism by providing a complete outer seal on one side of the slack adjuster body. In another form, the slack adjuster is constructed to further enhance its manufacturability and repairability. In this second form opposing sides of the slack adjuster are forged with identically-constructed recesses each for receiving a respective identically-constructed cover plate. The cover plates are fastened within respective recess grooves by peening a rim of the groove down over the peripheral edge of each cover plate.

In yet another cover plate form there is provided a pair of cover plates each with a peripheral skirt flared outwardly so that when inserted in its respective annular groove, and axially compressed, the skirt flares out even more and becomes diametrically enlarged and thus mechanically fixed within the groove. An alternate cover plate usable with the annular groove is constructed out of a resilient material which also includes a peripheral skirt that is initially deformed from its relaxed state prior to installation, so that when fitted within its respective groove and allowed to expand radially outwardly to its relaxed state, it becomes seated firmly within the groove.

A removable protective cap covers the adjustment mechanism to guard the mechanism from the corrosive environment. Moreover, each component can be individually treated with a proven corrosion-resistant material, such as zinc, to minimize the effect of the corrosive environment on the operation and life of the slack adjuster.

The design for the slack adjuster body in accordance with this invention also provides maximum support for the worm wheel included within the body. The worm wheel is an integral link in the transmission of braking force through the slack adjuster, and is subjected to substantial force loads. Accordingly, the life of a slack adjuster is improved, and the wear on the adjuster components is minimized, when the force-transmitting worm wheel is provided with such maximum support. In the same regard, the present slack adjuster design substantially increases the support for the worm gear which meshes with the worm wheel. The worm gear is another component which is subjected to substantial force loads during braking. Thus, improved support for the worm gear likewise prolongs the life of the adjuster mechanism by minimizing wear on the component parts.

The slack adjuster in accordance with the present invention also simplifies the sealing of the adjustment mechanism from the environment. Simple, standard sealing materials, such as flat gaskets or O-ring seals, can be used to protect the internal gear components from contamination by mud, rain, ice, or salt water. The resulting slack adjuster is strong and lightweight, and is relatively inexpensive to manufacture. It also has a prolonged life because of its increased load bearing capacity and its improved sealing features.

DESCRIPTION OF AN ILLUSTRATIVE EMBODIMENT

Further objects and features of the present invention, will become apparent from a description of illustrative embodiments thereof, taken in conjunction with the accompanying drawings, in which.

Figure 1:
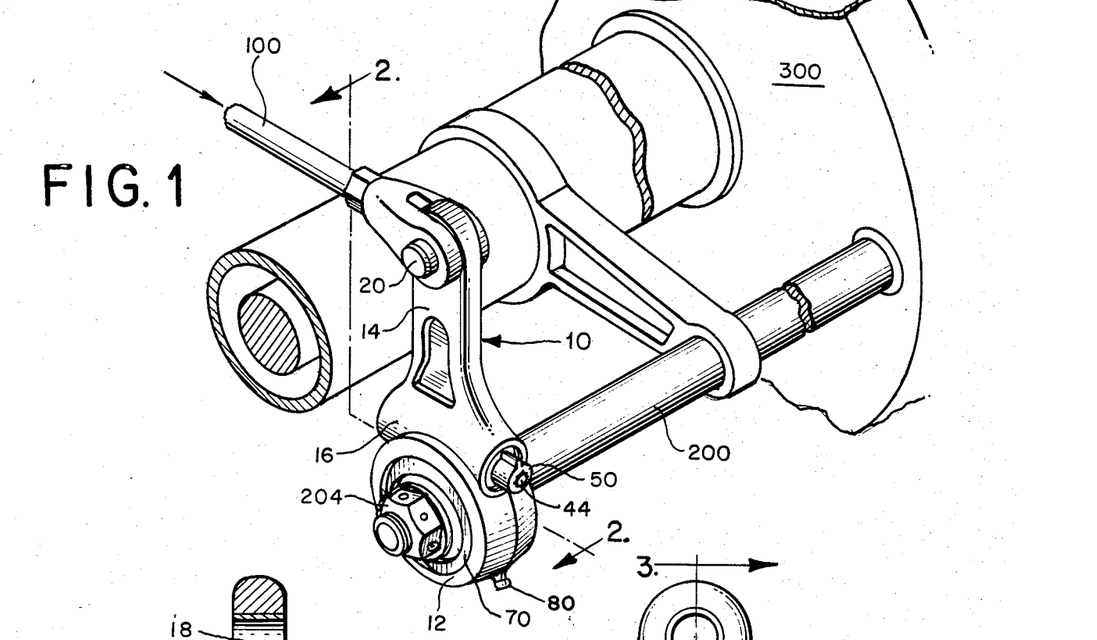
FIG. 1 is a perspective view showing one embodiment of the slack adjuster in accordance with this invention in a vehicle braking system with a braking force applied.

A first embodiment of a slack adjuster mechanism including the features and advantages of the present invention is generally indicated in FIGS. 1 through 7 by the reference numeral 10. As shown in FIG. 1, slack adjuster 10 is connected between the brake linkage 100 and a brake shaft 200. The application of a braking force to the linkage 100 will operate through the adjuster 10 to rotate the brake shaft 200 and apply the brakes by engaging brake shoes with the brake drum 300. As explained above, most wheels on a heavy duty vehicle, such as a truck, include a slack adjuster 10, to transmit the braking force from the linkage 100 to the shaft 200. In addition, the slack 10 is adjustable to take up the slack in the brake system which occurs after prolonged use.

Figure 4:
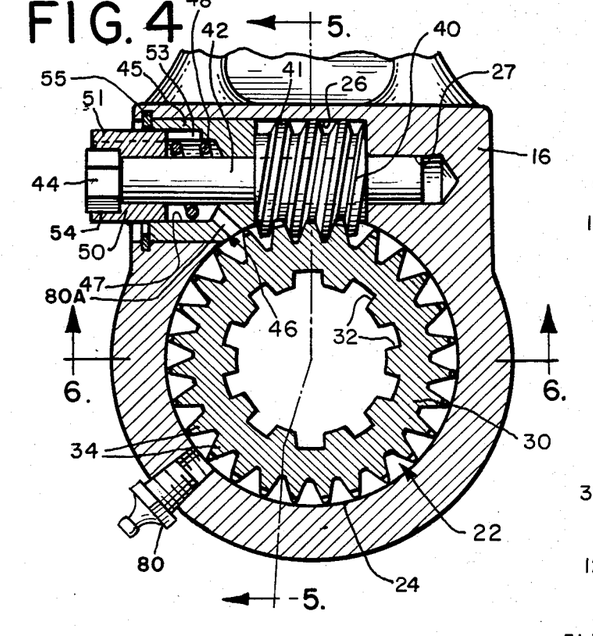
FIG. 4 is a cross-sectional view of the main body portion of the slack adjuster taken along the line 4—4 in FIG. 3.
Figures 4A, 6, 7:
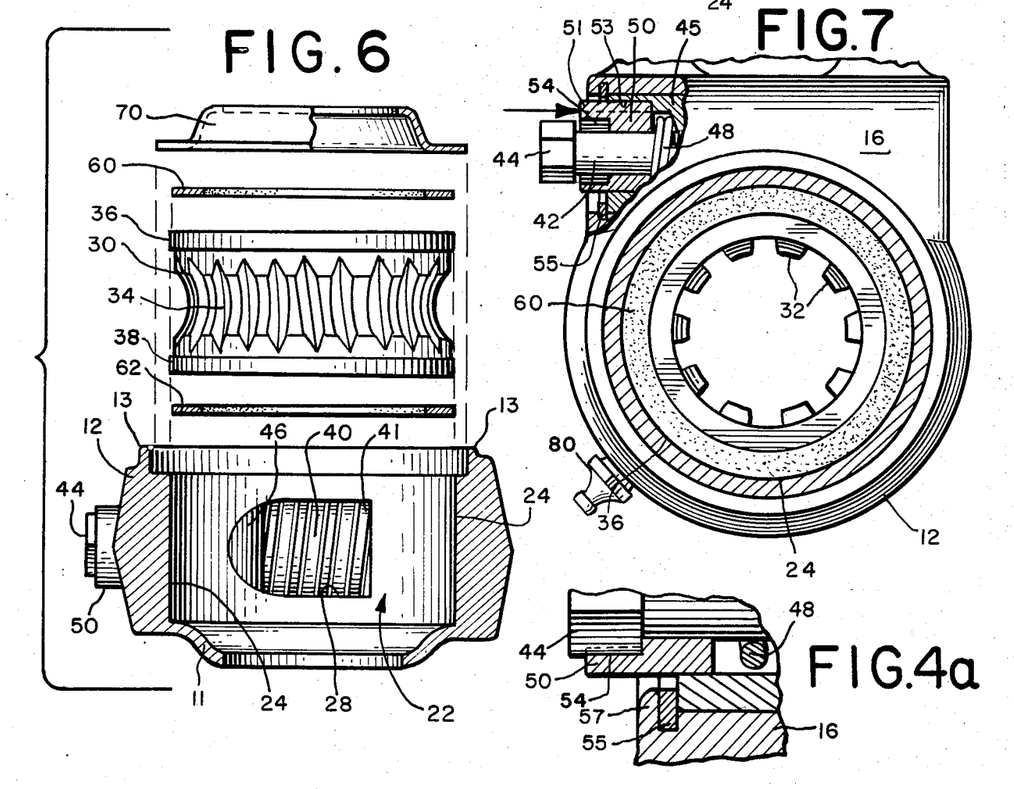
FIG. 4A is a removed sectional view of an alternative construction for the worn gear retaining means.
FIG. 6 is a sectional view of the slack body taken along the line 6—6 in FIG. 4, with the worm wheel, the sealing gaskets and the removable cover plate shown in an exploded arrangement.
FIG. 7 is a sectional view taken along the line 7—7 in FIG. 5, showing the engagement between the slack body and the worm wheel throughout 360 degrees, and showing the worm gear shaft, in partial section, prepared for adjustment of the worm gear and worm wheel.
Figure 5:
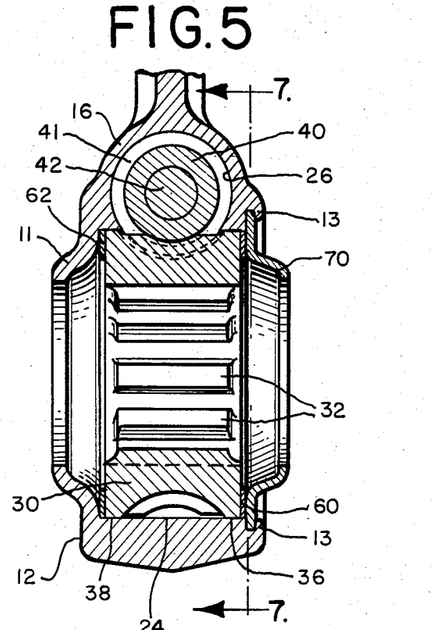
FIG. 5 is a cross-sectional view taken along the line 5—5 in FIG. 4, showing the relationship between the slack body, the worm wheel and the worm gear.

Referring to the drawings in more detail, the slack adjuster 10 includes a main body portion 12, having a generally circular configuration, a lever arm portion 14, and a central portion 16. The lever arm 14 includes a connecting aperture 18 for joining the arm to the brake linkage 100 by means of connecting pin 20, as seen in FIG. 1. The main body 12 includes a generally circular central opening 22 within which a rotatable gear arrangement is housed (see FIGS. 5 and 6). This opening 22 includes a machined internal bearing surface 24 which receives the rotatable gear arrangement which includes a worm wheel 30 with a close tolerance. As seen in FIGS. 1 and 4, the worm wheel 30 includes a central opening 32 which is splined to accept the splines 202 on the brake shaft 200 (See FIG. 2). The central part of wheel 30 includes spiral gear teeth 34, shown clearly in FIG. 6. The external edges of the wheel 30 include circular bearing shoulders 36 and 38 which engage with the internal bearing surface 24. As seen in FIGS. 5 and 6, the teeth 34 have a smaller diameter than the shoulders 36, 38 and do not engage with the surface 24.

As shown in FIG. 4, the bore 26 is drilled to be tangential to the central opening 22. The intersection of the bore 26 and the central opening 22 provides an additional opening 28 which places the bore 26 and the opening 22 in communication, as shown in FIG. 6. The bore 26 is machined with a major diameter for receiving and supporting a worm gear 40. Worm gear teeth 41 on the gear 40 are supported by the bore 26, and are designed to mesh with the teeth 34 on the worm wheel. The bore 26 also has a minor diameter 27 for receiving and supporting the end of a worm gear shaft 42.

The major internal diameter of the bore 26 and the external diameter of the worm gear 40 are selected to be equal, within a close machine tolerance. This arrangement, which eliminates excess clearance between the gear 40 and the bore 26, allows the bore 26 to provide bearing support for the worm gear 40. The slack 10 is thereby strengthened, and the size and weight of the shaft 42 can be reduced.

As seen in FIGS. 4 and 7, the external end of the gear shaft 42 includes an enlarged hex head 44. This head 44 is designed to receive a simple tool, such as an adjustable wrench, for rotating the shaft 42 and the worm gear 40 during the adjustment of the braking system by the slack adjuster 10. A retaining plug 45 is positioned on the shaft 42 within the bore 26. A bevel 46 is provided on the inside of the lower end of the plug 45, as seen in FIG. 4, so that the plug does not interfer with the worm wheel 30. The plug 45 is press fit into the bore 26 and retains the worm gear 40 in the proper position within the bore during the operation of the adjuster 10. The outer end of the plug 45 is provided with an axial opening 47 which retains a compression spring 48 around the shaft 42. In addition, a slidable socket sleeve 50 is positioned on the outer end of the shaft 42, as seen in FIGS. 4 and 7. The socket sleeve 50 has a 12-point hexagonal bore 54 (See FIG. 3) which receives the hex head 44 of the shaft 42. A six-point hexagonal bore also can be used in the sleeve 50, if desired. Further, the force of the compression spring 48 urges the sleeve 50 outwardly, and captures the hex head 44 in the bore 52 under normal operating conditions.

Figure 3:
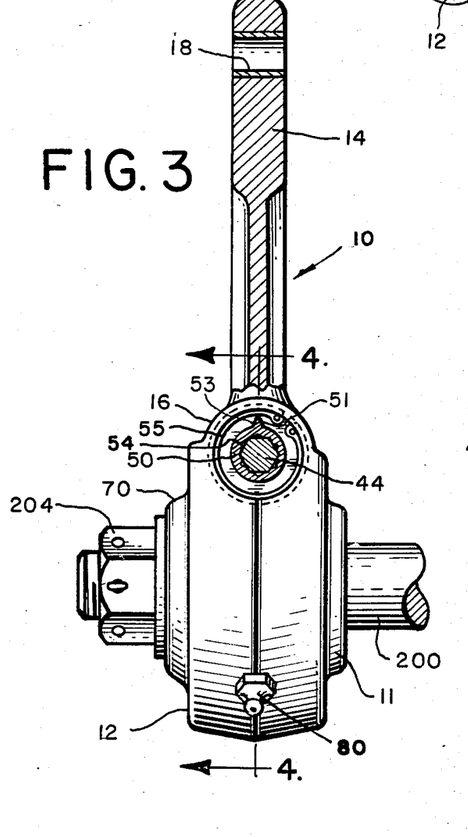
FIG. 3 is a partial sectional view of the slack adjuster taken along the line 3—3 in FIG. 2.

As seen in FIGS. 3 and 4, the upper portion of the sleeve 50 includes a key 51, and the adjacent portion of the bore 52 includes a keyway 53. The key 51 and the keyway 53 cooperate to permit the sleeve 50 to slide inwardly and outwardly within the bore 52, but prevent the sleeve from rotating. Thus, the sleeve 50 likewise prevents the hex head 44 and a shaft 42 from rotating unless the sleeve is forced inwardly, from a position shown in FIG. 4 to a position such as shown in FIG. 7, so that the sleeve 50 clears the hex head 44.

The operation of the slack adjuster 10 applies a substantial axial load on the worm gear 40 and the worm gear shaft 42. Accordingly, the adjuster 10 must include substantial retaining means to assure that the worm gear 40 and the plug 45 do not shift axially in the slack body portion 16 during operation of the adjuster. To accomplish this purpose, the bore 26 is provided with a groove which receives a high-strength retaining clip 55, as seen in FIGS. 4 and 7. This clip prevents the plug 45 and the worm gear 40 from sliding axially within the bore 26. In addition, to assure no movement of the worm gear 40, the portion of the body 16 adjacent the external end of the bore 26 can be peened down, such as shown in FIG. 4A. This peening creates a sholder 57 that will permanently fix the retaining clip 55 in the slack body portion 16.

The slack adjuster 10 in accordance with one aspect of this invention incorporates means for protecting the worm wheel 30 and the worm gear 40 from the adverse environment in which the slack is used. In one embodiment, the main body portion 12 is forged with an integral cover plate 11 (See FIGS. 5 and 6). This integral cover plate 11 eliminates the need for a separate part to protect one side of the worm wheel 30. It also reduces the cost of making the slack by forming one cover plate at the same time that the slack body 10 is being forged. The integral cover plate provides additional strength to the main body and is thus especially advantageous in those applications where a strong rugged slack adjuster is required.

The cover 11 provides support for a flat gasket seal 62, as shown in FIGS. 5 and 6. The seal 62 prevents damaging substances, such as dirt and salt water, from entering into the opening 22 between the machined outer surface 24 and the bearing shoulder 38. A central opening in the cover plate 11 adapts the plate to receive the shaft 200. A retaining nut and washer arrangement 204, as shown in FIG. 1, engages the integral cover plate 11 to assist in retaining the slack 10 on the shaft 200.

The other side of the slack body 10 also has protection from the elements as a result of a removable cover plate 70. Plate 70 also includes a central opening to receive the shaft 200. A second flat gasket seal 60 is placed between the cover 70 and the worm wheel 30, to seal the joint between the worm wheel and the slack body (See FIGS. 5 and 6). The seal 60 thereby prevents dirt, salt water and the like from entering between the machined outer surface 24 and the adjacent bearing shoulder 36. The seals 60 and 62 also prevent the lubricant from within the slack from leaking out should the grease tend to liquify under elevated temperatures.

It is apparent that the seals 60 and 62 cooperate to keep contaminating material from entering between the engaging teeth 34 and 41 of the worm wheel 30 and worm gear 40, respectively. The wear on the engaged gear teeth is thus materially reduced, and the useful life of the slack components enhanced. The cover plates 11 and 70 likewise cooperate to retain the seals 60, 62 and worm wheel 30 in the proper positions within the main slack body portion 12. The proper position for these components is fixed and maintained by forging the rim 13 provided on the slack body 12 over the entire peripheral edge of the cover plate 70, as shown in FIG. 5.

While those skilled in the art may find in some applications that commercial considerations dictate the need for the strength characteristics of the slack adjuster attendant with the integral side cover, others may find that economic considerations weigh in favor of the alternate arrangements shown in FIGS. 13-16. With these arrangements the slack adjuster 10 is constructed with an aim of further reducing the weight of the device, as well as facilitating its manufacturability.

Figure 13:
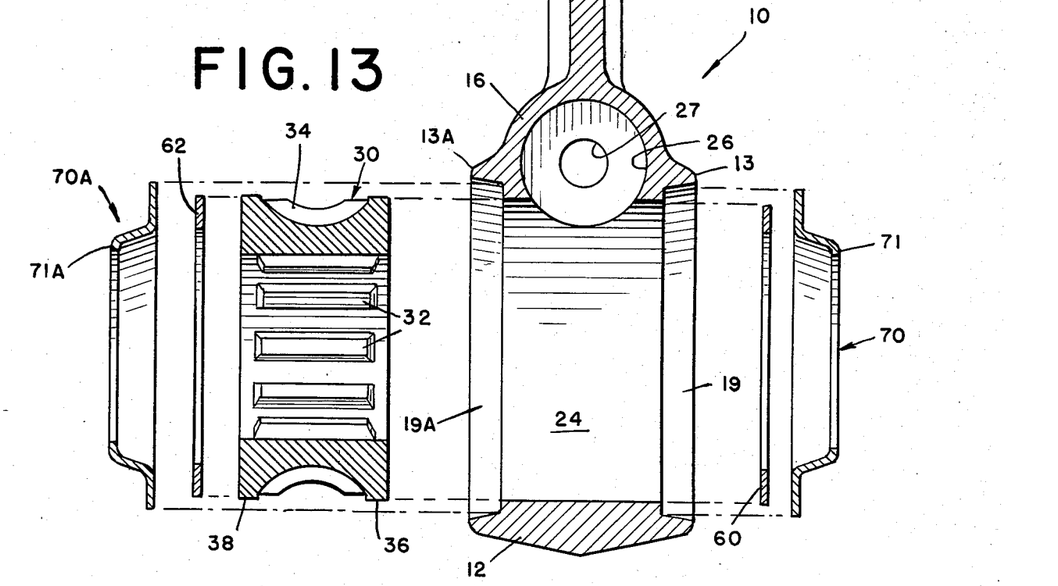
FIG. 13 is a partial sectional view, similar to FIG. 5, but illustrating the symmetrical construction of the disassembled slack adjuster body adapted for accommodating a pair of removable cover plates and sealing gaskets shown in exploded form.

In achieving this aim the main body portion 12 of the slack adjuster 10, as shown in FIG. 13 is forged or molded with the left and right halves being symmetrical. This aspect facilitates both the development of a mold and the machining operation involved in finishing or milling the various surfaces. The machine operation is simplified in this arrangement as the internal bearing surface 24 can be broached completely through the main body portion 12, and from either side, to form such bearing surface 24. This advantage follows from the feature that the annular recesses 19 and 19A, which are concentric with the internal bearing surface 24, have inside diameters which are larger than that of the internal bearing surface 24.

The finishing or the formation of both annular recesses 19 and 19A can be accomplished with the same machine setup by performing the machining operation on one side to form recess 19, and then turning the adjuster 10 over and performing the same operation to form recess 19A. An obvious saving in labor and time in manufacturing the device is thereby achieved.

It can be appreciated that the worm wheel 30 of FIG. 13 can be installed within the main body portion 12, into engagement with the spiraled worm gear 40, from either side of the adjuster device. Because this arrangement employs a pair of replaceable cover plates 70 and 70A, the replacement of either gasket seal 60 or 62 can be had without removing worm wheel 30 from the adjuster assembly. This decreases the likelihood, based on the environment in which such assemblies are used, of allowing the lubricated wheel 30, or bearing surface 24, from coming into contact with dirt or other abrasive materials during repair.

Figure 14:
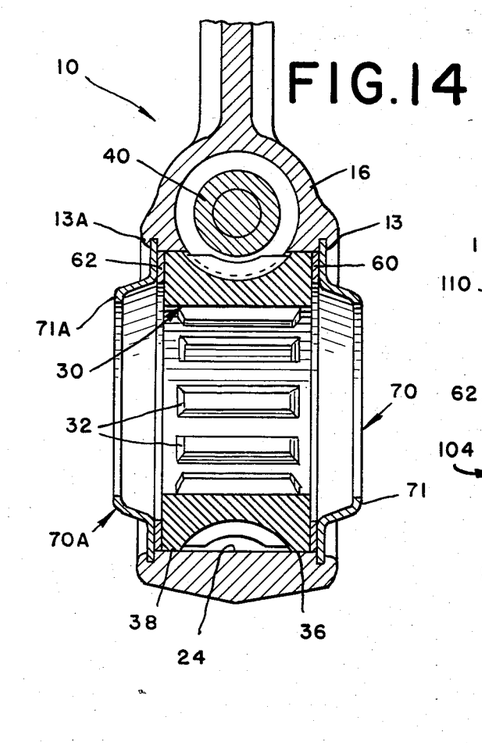
FIG. 14 is a partial sectional view, also similar to FIG. 5, illustrating the slack adjuster of FIG. 13 in assembled form.

The arrangement shown in FIGS. 13 and 14 does not require any additional different parts over the embodiment shown in FIG. 5. This feature is a result of machining the annular recesses 19 and 19A dimensionally identical so that the removable cover plate 70 of FIG. 5 can be advantageously used on either side of the slack adjuster shown in FIGS. 13 and 14.

Each cover plate 70 and 70A is provided with a respective domed part 71 and 71A which serve both as a means to achieve a desired width of the device (based on the amount by which each cover plate is domed), and also to provide a pocket within which lubricating grease can collect. In this latter respect excess grease that has been pumped into the slack adjuster 10 is squeezed out around the brake shaft area and is thereby collected in the pocket area formed by the dome. This excess grease serves as a barrier to prevent contaminants from entering within the slack adjuster should a gasket seal become defective. Moreover, if dirt and abrasive material become embedded within the excess grease, the application of additional grease through the fitting 80 pushes the contaminated grease outwardly from the adjuster, rather than toward lubricated bearing surfaces.

As described above in connection with FIG. 5, the annular rims 13 and 13A of the respective recesses are forged so as to extend outwardly to a narrowed edge thereby enabling such edge to be deformed radially inwardly, such as by peening or swaging, over the peripheral edges of the cover plates 70 and 70A thus mechanically sealing each such plate within its recess.

FIG. 14 depicts an assembled cross-section of the slack adjuster 10 with the teeth of the worm gear 40 and wheel 30 interengaged, and with each cover plate 70 and 70A fixed within their recesses as a result of the annular rims 13 and 13A being deformed over the peripheral edge of each such cover plate. It can be visualized from FIG. 5 that the width of the slack adjuster 10 can be effectively changed by providing cover plates domed by various amounts. This feature permits the same basic slack device to accommodate break shafts 200 having ends splined to various links.

Figure 15:
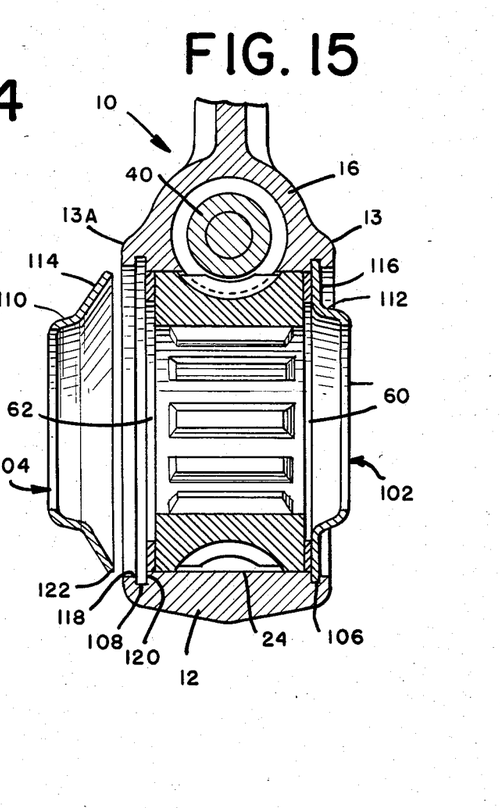
FIG. 15 is a partial sectional view of the device body illustrating a pair of domed cover plates each with a flared rim adapted to be compression fitted into an annular groove in the device body.

FIG. 15 illustrates a third arrangement for removably containing the worm wheel 30 within the slack adjuster body 12. With this construction the deformation of a forged body rim over the cover plate edge is eliminated in favor of a pair of compression fitted cover plates 102 and 104. FIG. 15 depicts cover plate 102 compression fitted into an inside annular groove 106, and depicts cover plate 104 before being seated within its respective inside annular groove 108. Gasket seals 60 and 62 are shown for the sake of completeness.

The cover plates 102 and 104, as well as the form shown as 70 and 70A, are preferably cold stamped and formed out of sheet material. The plates 102 and 104 are thereby quickly and economically produced. In the preferred form, fourteen gauge material is used, however, other gauges may be employed to satisfy particular strength or cost criteria.

As with the cover plate version shown in FIG. 14, the version shown in FIG. 15 includes a domed portion 110 and 112, and a peripheral skirt 114 and 116 flared outwardly. With regard to cover plate 104 the skirt 114 is flared outwardly about fifty degrees, and then becomes flared radially even more (See cover plate 102) when subjected to an axial compressive force during the assembly stage.

Annular groove 108 is cut adjacent the outer edge of the bearing surface 24 and is slightly wider than the material thickness of the cover plate—0.08 inches in the preferred form. The outer part 118 of the annular groove is of a larger diameter than that of the inner part, or bearing surface 24, and is slightly larger in diameter than that of the uncompressed cover plate 104. This permits the cover plate 104 to be dropped into the annular groove area until it is stopped by the shoulder 120 formed by the edge of the bearing surface 24. An axial impact or compression force is then applied to the domed portion 110 until the flared skirt 114 diametrically spreads and bottoms out in its groove 108. As a secondary sealing measure, the rims 13 and 13A may be axially compressed to squeeze the cover plate peripheral edges within their respective grooves.

As with the FIG. 14 cover plate version, the version shown in FIG. 15 includes identically-constructed cover plates, and annular grooves identically machined in the slack body 12. The symmetry of the slack adjuster in these respects provides a more easily manufacturable and cost effective device. The cover plates shown in FIG. 15 permit the worm wheel 30, gaskets 60, 62, and cover plates 102 and 104 to be assembled at one time and compressed in one operation to form a sealed slack adjuster. Of course, a separate compressive force may be applied to each cover plate thereby necessitating two operations.

In those situations where the rims 13 and 13A are not deformed, the cover plate version of FIG. 15 is additionally advantageous insofar as each plate may be removed without disturbing the peened rim of the slack body, as is the case with the FIG. 14 arrangement. When it is determined that the slack adjuster 10 needs to be disassembled, one or both of the cover plates 102 or 104 can be torn out of its respective annular groove. It should be understood that in this case the cover plates 102 and 104 are fixed within their respective grooves 106 and 108 through radial pressure between the cover plate peripheral edges 122 and the bottom of the groove. The cover plates 70 and 70A of FIG. 14, on the other hand, are fixed to the device body 12 by the axial compressive force of the forged rim 13 peened over the peripheral edge of the cover plates 70 and 70A.

Removal of the cover plates 102 or 104 can be facilitated by locally heating a portion thereof, such as by a carbon arc torch, and deforming the plate sufficiently to extract it from its groove.

Figure 16:
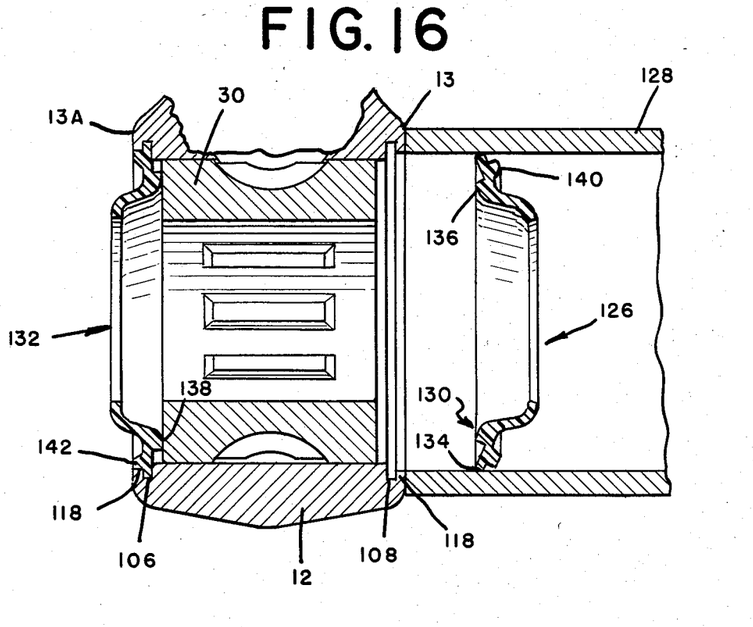
FIG. 16 is a partial sectional view of the slack adjuster illustrating the use and installation of a resilient cover plate in an inside annular groove in the slack body.

FIG. 16 shows as partial sectional view of the slack adjuster body portion 12 of FIG. 15, and a resilient cover plate 126 just prior to its installation into the annular groove 108. This version of the cover plate 126 is generally shaped like the cover plate 70 of FIG. 13, except it is constructed of a resilient material such as nylon, Plexiglas or Teflon. While these materials are desirable for their noncorrosive and resilient properties, resilient spring-like metals could be used. FIG. 16 illustrates the resilient cover plate 126 in its preinstallation form wherein it is forced into an assembly cylinder 128 until the peripheral skirt 130 is forced into a funnel-shape characteristic thereby reducing its outermost diameter. In this manner the cover plate 126 is adapted to be forced into the annular groove 108 where it is then allowed to radially expand to its relaxed state bottoming out in the groove 108 and becoming seated. In its relaxed state in the groove 108, the resilient cover plate 126 would appear as resilient cover plate 132 installed in its annular groove 106.

In keeping with the cost effective features of the invention, resilient cover plates 126 and 132 include respective inside annular ridges 136 and 138, and outside annular ridges 140 and 142. The provision of inside annular ridges 136 and 138 eliminates the need for sealing gaskets as such ridges contact the side surface of the worm wheel 30. This aspect is shown by cover plate 132 where the inside ridge 138 extends into the area normally occupied by a sealing gasket and contacts the side edge of worm wheel 30. The inside ridges are constructed such that in the installed relaxed state, a pressure is exerted by the inside ridges on the worm wheel side. A seal is thereby effected between the cover plates and the worm wheel.

The outside annular ridges 140 and 142 are constructed to fit tightly against the outer groove edge 118 to thereby establish a seal between such contacting surfaces. As with the installation techniques set forth above, the resilient cover plates may be fixed within their respective annular grooves by crimping the rims 13 and 13A inwardly to squeeze the peripheral edges of the cover plates.

To aid in the installation of the resilient cover plate 126, the outermost peripheral edge 134 thereof may be rounded such that it will easily slide over the transition between the slack body edge 118 and the installation cylinder 128 without catching on an edge. Also, the cylinder 128 may be of slightly smaller diameter than the slack edge 118 opening thereby permitting the resilient cover plate 126 to be easily pushed into the annular groove 108.

With the arrangement of FIG. 16, a further reduction in weight and cost is achieved, as well as a simplified installation process and a corresponding reduction in labor. It can also be appreciated that with the use of a resilient cover plate the removal thereof is facilitated to a great extent as it is not permanently deformed upon installation. That is to say that the resiliency of the material lends itself well to extraction when an outwardly directed force is applied to the cover plate.

As referred to above, means are provided for lubricating the worm gear 40, the worm wheel 30 and the adjustment mechanism 42, 50. Accordingly, the slack body 12 (See FIG. 4) is provided with a grease fitting 80, for introducing lubricating grease into the slack. A lube passage 80A (See FIG. 4) allows the lubricant to flow into contact with the shaft 42 and sleeve 50 of the adjustment mechanism.

The slack adjuster 10 of this invention can be adapted for a variety of torque ratings and loading requirements. For instance, the design can be used in 15,000, 20,000 or 30,000 pound manually adjustable slacks, with straight or offset lever arms. Costs of materials, manufacture and shipping are significantly reduced by a weight reduction of the finished slack adjuster in the range of 10% to 15%. In one instance, the design shown in FIGS. 1-7 reduced the weight of a finished, completely assembled, straight arm slack from about 4.50 pounds with a conventional design, to about 3.75 pounds. A further reduction in weight is achieved by the versions shown in FIGS. 14, 15 and 16.

The design of this first embodiment also provides a slack adjuster body which maintains its strength and load-carrying capacity despite the substantial reduction in weight. The strength of the slack is maintained and enhanced because the major load-carrying components have improved support. The worm gear 40 is supported laterally by the bore 26 and the body portion 16 throughout at least one-half of the gear circumference. Similarly, the plug 45 and the retaining means 55, or 55 and 57, reinforce the worm gear 40 during axial loading. With respect to the worm wheel 30, the cover plates 11 and 70 resist lateral loads effectively. Most significantly, the entire periphery of the wheel 30 is supported against torsional and radial loading. This substantial support results from the engagement between the support surface 24, and the slack body 12, and the dual shoulders 36 and 38 on the wheel 30, throughout the entire circumference of the wheel.

The slack 10 embodies other features and advantages. As noted above, it allows the use of a suitable standard hard flat seating material to protect the slack from the environment. It also includes means to prevent accidental movement between the worm gear 40 and wheel 30, while insuring that positive adjustment to take up slack can be done with simple tools. To accomplish this adjustment, the socket sleeve 50 is retracted against the force of the spring 48, to expose the hex head 44 (see FIG. 7). Then, a wrench can be applied to the hex head 44, to rotate the shaft 42 and the worm gear 40. When the adjustment is completed, the spring 48 returns the sleeve 50 outwardly over the hex head 44.

A second embodiment of the slack adjuster mechanism in accordance with the present invention is illustrated in FIGS. 8-12 of the drawings. Many of the basic components of this second embodiment are the same as described above with respect to the first embodiment shown in FIGS. 1-7. Accordingly, like reference numerals have been used to indicate the same component parts.

Figure 8:
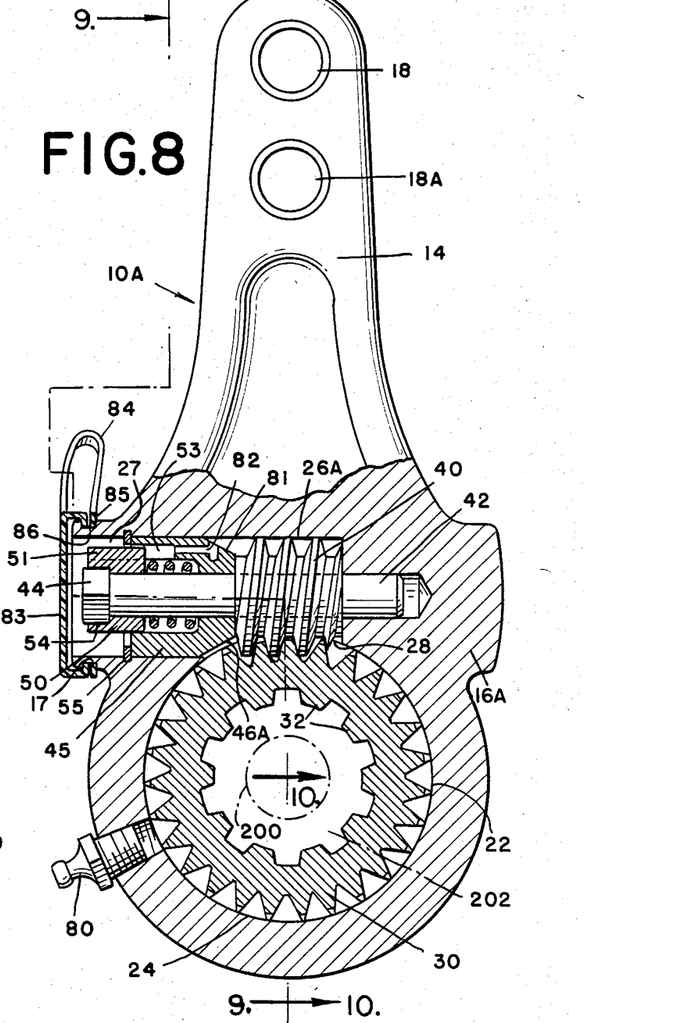
FIG. 8 is a partial sectional front elevational view of a second embodiment of a slack adjuster in accordance with this invention, as viewed along the line 8—8 in FIG. 9.

This second embodiment of the slack adjuster 10A includes a main body portion 12 of generally circular configuration, and an upper lever arm portion 14. As seen in FIG. 8, the lever arm 14 in this embodiment includes two connecting apertures 18 and 18A, for joining the arm to the brake linkage 100 by a connecting pin 20 (See FIG. 1). The use of two apertures 18, 18A permits more flexibility in connecting the arm to the brake linkage, and also permits the use of a bifurcated connection.

Figure 9:
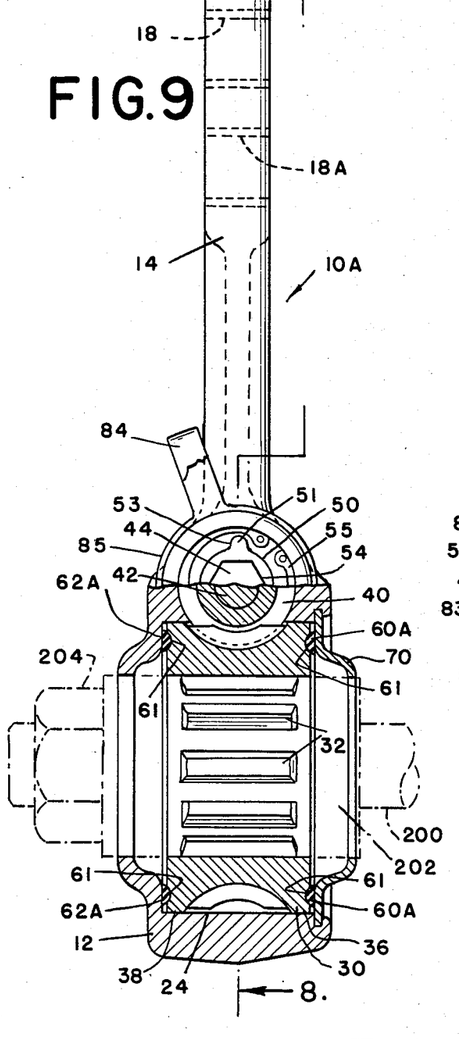
FIG. 9 is a partial sectional side view of the second embodiment of the slack adjuster, taken along the line 9—9 in FIG. 8.

As shown in FIGS. 8 and 9, the main body 12 defines a generally circular central opening 22 which includes a machined internal bearing surface 24 for receiving the worm wheel 30 within close tolerance. As shown in FIG. 9, the external edges of the wheel 30 define circular bearing shoulders 36 and 38 which engage with the surface 24 during the operation of the slack adjuster. These bearing shoulders 36 and 38 are preferably heat-treated and hardened to prolong the life of the worm wheel 30.

Figure 10:
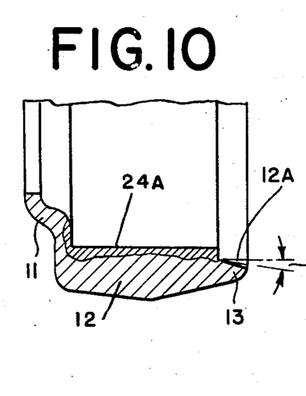
FIG. 10 is a removed sectional view showing the wear-resistant treatment of the slack body surfaces which engage with the worm wheel.

As shown in FIG. 10, the internal surface 24A of the bearing 24 in accordance with the second embodiment is also heat treated and hardened. This hardened surface, which is formed by flame induction or other suitable means, provides a wear hardness which is compatible to the hardness of the circular bearing shoulders 36 and 38 on the worm wheel 30. Accordingly, the contact fit between the hardened bearing shoulders 36 and 38, and the hardened bearing surface 24A on the slack adjuster body, will prevent the premature wear of the parts, and will also preclude excessive movement and lost motion in this area of the slack adjuster mechanism.

Figure 2:
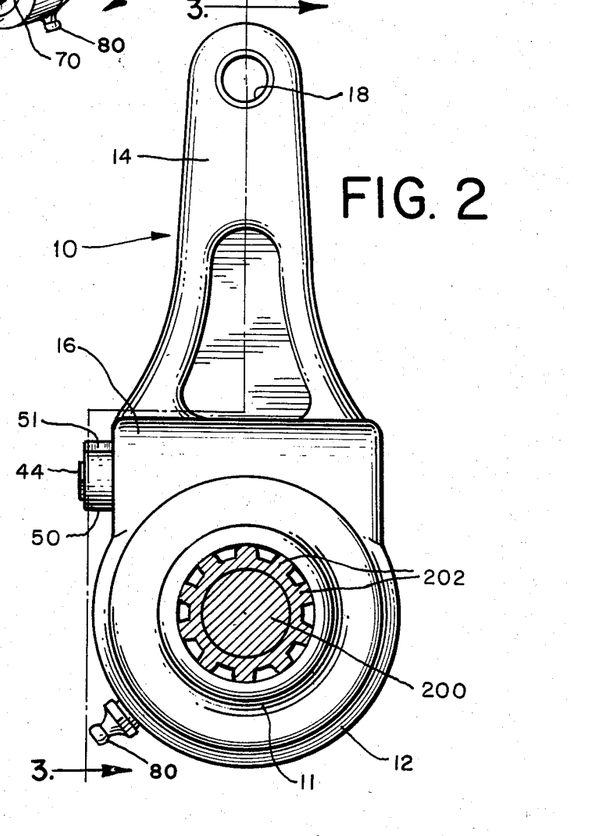
FIG. 2 is an elevational view of the slack adjuster as seen along the line 2—2 in FIG. 1.

As seen from a comparison of FIGS. 2 and 8, the central portion 16A of the slack adjuster body 10A is wider than the corresponding portion 16 of the first embodiment of the slack adjuster 10. This increased width in the central portion 16A is provided to allow for a protective recess 27 in the slack body.

This recess 27 houses the adjustment mechanism formed from the shaft 42 having a hex head 44, and the sliding sleeve 50. As shown in FIG. 8, the recess 27 comprises the outer end of a bore 26A, which is drilled into the central portion 16A tangential to the central opening 22. This bore 26A intersects the opening 22 to provide an additional opening 28, as described above, which places the bore 26A and the opening 22 in communication. The bore 26A is machined to provide a major diameter which receives a worm gear 40. As described above with respect to the first embodiment, major diameter of the bore 26A is the same dimension as the external diameter for the worm gear 40, within a close machine tolerance. Therefore, the worm gear 40 is engaged with and firmly supported by the bore 26A during the operation of the slack adjuster 10A. A minor diameter in the central body 16A supports the end of worm gear shaft 42, as shown in FIG. 8.

As described above with respect to FIGS. 4 and 7, the slack adjuster 10A shown in FIGS. 8-12 includes an adjustment mechanism for selectively rotating the worm wheel 30 through the worm gear 40. This mechanism includes the gear shaft 42, having an enlarged hex head 44 on its outer end. A retaining plug 45 positioned on the shaft 42 within the bore 26A guides the shaft 42, and allows a sleeve 50 to slide laterally within the bore 26A. In this second embodiment, the inner end of the plug 45 is provided with a bevel 46A which surrounds the plug. The bevel 46A thus allows the plug to be located in any orientation within the bore 26A without interfering with the operation of the worm wheel 30.

As seen in FIG. 8, protective recess 27 is designed to receive the outer hex head 44 of the shaft 42, the plug 45, and the sliding sleeve 50 of the slack adjustment mechanism. In this manner, the movable components of the adjustment mechanism, including the shaft 42 and the sliding sleeve 50, will be protected from the corrosive environment in which the slack 10A is used. Nevertheless, adjustment can be performed readily by inserting an appropriate socket wrench or the like within the protective recess 27, and into engagement with the hex head 44 of the shaft 42. The insertion of the wrench will retract the sleeve 50 and expose the hex head 44, and permit manual adjustment of the slack in the brake linkage mechanism, as described above.

The lubrication of these components of the adjustment mechanism, as well as the worm wheel 30 and worm gear 40, is accomplished by means of the lubrication fitting 80 provided in the slack body 12. Also, a lubrication passage 82 is provided in the plug 45, as shown in FIG. 8. This passage 82 permits the lubricating grease to be continuously applied to the engaged sliding surfaces of the shaft 42 and the sliding sleeve 50. Thus, the component parts of the slack adjuster 10A will be maintained in a protected and lubricated environment.

This second embodiment of the slack adjuster 10A also includes a removable cap 83 for closing the protective recess 27 from the environment. This cap 83, in the embodiment shown in FIGS. 8 and 9, is formed from a flexible material such as plastic or the like, and includes an integral connecting tab 84. The tab 84 is joined to a ring portion 85 which snap-fits into a groove 17 provided on the outer perimeter of the central portion 16A. The cap 83 includes a flexible flange 86 which also snap-fits into the groove 17. The flange 86 will removably retain the cap 83 in a position which closes the recess 27 from the environment.

The cap 83 can be opened, such as with a screwdriver or other tool, to allow the adjustment mechanism to be utilized. As the adjustment is occurring, the connecting tab 84 prevents the cap 83 for being lost or misplaced. After the adjustment is completed, the cap 83 can be snapped into place, to once again protectively enclose the adjustment mechanism within the recess 27. The cap 83 also functions to prevent leakage of the lubricating grease from the slack through the open recess 27.

Figure 12:
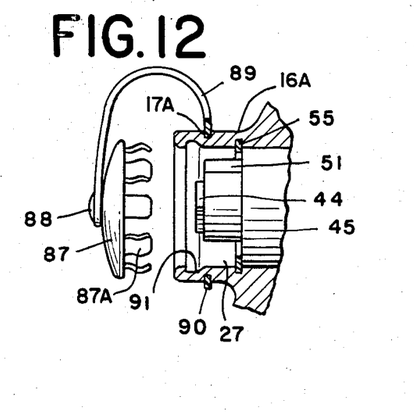
FIG. 12 is a removed partial sectional view showing an alternative removable cap means for sealing the adjustment mechanism from contamination by the slack adjuster environment.

FIG. 12 shown an alternative embodiment of the protective cap for enclosing the outer end of the recess 27. In this alternative embodiment, a metal cap 87 is provided with flexible fingers 87A around its periphery. A rivet 88 or other suitable fastener joins the cap 87 to a connector tab 89. The tab 89 in turn includes a ring portion 90 which is captured within a suitable circular groove 17A provided in the central body portion 16A of the slack adjuster. Further, the internal diameter of the recess 27 is provided with a groove 91, as seen in FIG. 12. The groove 91 is dimensioned and positioned to receive the flexible fingers 87A on the cap 87, when the cap is inserted within the recess 27. The cap 87 will thus completely close the recess 27 to the environment, and thereby protect the adjustment mechanism from corrosive elements and prevent leakage of the lubricant. When adjustment is to be accomplished, the cap 87 can be snapped out of the opening 27 with a screwdriver or other suitable tool. Likewise, the cap 27 can be snapped back into place within the opening 27, after the adjustment is accomplished.

The slack adjuster 10A includes other features and advantages which assure that the internal wear and load-bearing surfaces of the mechanism are retained firmly in the proper position and are sealed from the corrosive environment. In this regard, as seen from FIG. 10, the main body portion 12 is provided with a beveled annular recess 12A adjacent the rim of the body. This beveled recess 12A has inwardly converging side walls, which are tapered from the axial center of the central recess 22 by the angle T, as shown in FIG. 10. In one preferred arrangement, this taper T is about 2 degrees. The presence of this taper T assures a tight fit between the body 12 and the cover plate 70 when the slack 10A is assembled. Since the cover plate 70 is usually a stamped part, it may have a tolerance which would cause the cover to fit loosely within the recess of 12A. However, since the groove 12A is tapered, the cover plate 70 will be securely retained on the body 12 by a wedging action between the cover and the tapered recess. Then, the rim 13 of the body 12 can be forged over the entire periphery of the cover 70, to close the one side of the slack adjuster mechanism. The side of the slack body 12 having the separate cover plate 70 wedged and peened in place thus will have increased structural integrity and strength which closely approximates the strength and integrity of the integral cover plate 11 provided on the other side of the body 12.

Figure 11:
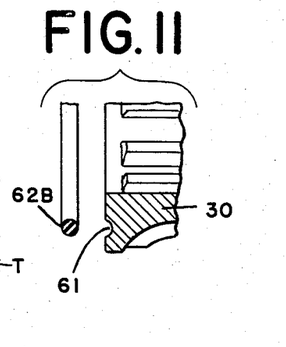
FIG. 11 is a removed sectional and exploded view showing the relationship between the O-ring seal and the sealing groove provided in the worm wheel in the second embodiment.

FIG. 11 illustrates a further modification to the slack adjuster 10A in accordance with this invention. In adjuster 10A, the flat sealing washers 62, described above, are replaced with an O-ring or shaped-ring seal of rubber or other suitable material. This O-ring, indicated in FIG. 11 as 62B, is captured within a correspondingly dimensioned groove 61 provided in the adjacent surface of the worm wheel 30. The shaped rings shown as 60A and 62A in FIG. 9 have a shaped and flattened outer surface, as compared to the circular 'O' ring as depicted in FIG. 11. As shown in FIG. 9, the shaped rings 60A, 62A or 62B are positioned to seal the juncture between the worm wheel 30 and the cover plates 11 and 70.

The interior of the slack adjuster 10A will be effectively protected from the corrosive environment by the operation of these shaped seals 60A, 62A and 62B, which are held securely in place by the grooves 61. The component parts of the slack adjuster will therefore be maintained in a lubricated condition which assures that the parts will function to allow periodic adjustment of the slack in the brake linkage system. Free movement of the parts also can be facilitated by individually treating each component with a corrosion-resistant material, such as zinc, prior to assembly.

Although the invention has been described above with a certain degree of particularity, it should be understood that the disclosure has been made only by way of example. Consequently, numerous changes will be apparent to those familiar with the art, and may be resorted to without departing from the scope of this invention as claimed.

What is claimed is:

1. A manually adjustable brake slack adjuster comprising:
   a slack adjuster body having a main portion provided with a central opening, an intermediate portion and a lever arm portion;
   means provided on the lever arm portion for applying a braking force to the slack adjuster;
   rotatable gear means housed within said central opening to allow slack within a braking system to be adjusted;
   a pair of cover plates each provided on respective sides of said main body portion, and each having an opening through which a brake shaft may be received; and
   a rim on said main body portion positioned around at least one side of said central opening and extending outwardly from said slack adjuster beyond at least one of said cover plates, said rim being deformable over said one cover plate to thereby secure said one cover plate on said slack adjuster.

2. A manually adjustable brake slack adjuster comprising:
   a slack adjuster body having a main portion provided with a central opening, an intermediate portion and a lever arm portion;
   means provided on the lever arm portion for applying a braking force to the slack adjuster;
   rotatable gear means positioned within said central opening to allow slack within a braking system to be adjusted; and
   an inside annular groove in said body portion and a cover plate with a skirt adapted to snap fit within said groove and cover said central opening.

3. A manually adjustable brake slack adjuster comprising:
   a slack adjuster body having a main portion provided with a central opening, an intermediate portion and a lever arm portion;
   means provided on the lever arm portion for applying a braking force to the slack adjuster;
   rotatable gear means positioned within said central opening to allow slack within a braking system to be adjusted;
   cover means associated with said slack adjuster body and having an opening through which a brake shaft may be received; and
   at least one of said cover means and said slack adjuster body being deformable to facilitate removably securing said cover means to said slack adjuster body.

4. The slack adjuster in accordance with claim 3 wherein said cover means includes first and second cover means; at least one of said first and said second cover means is comprised of a resilient material having a peripheral skirt initially compressible so as to decrease the diameter thereof, whereby when said peripheral skirt is relaxed, the diameter thereof increases sufficiently so that said cover means becomes removably securable to its respective side of said main body portion.

5. The slack adjuster in accordance with claim 3 wherein said cover means includes first and second cover means; at least one of said first and said second cover means includes a peripheral skirt initially flared outwardly, whereby when subject to an axial compressive force during installation, said skirt flares outwardly further to thereby increase the diameter thereof and become secured to its respective side of said main body portion.

6. The slack adjuster in accordance with claim 3 wherein said cover means comprises first and second cover plates each including a peripheral skirt initially flared outwardly, whereby when subjected to an axial compressive force during installation, said skirt flares outwardly further to thereby increase the diameter thereof and become permanently affixed within said annular groove.

7. The slack adjuster in accordance with claim 1 wherein said peripheral skirt is flared outwardly about 50 degrees before being subjected to said compressive force.

8. A slack adjuster in accordance with claim 3, further including a pair of annular recesses each disposed on an opening surface of said slack adjuster body and concentric with the central opening of said main portion, said cover means comprising first and second cover plates each with a pheripheral portion fittable into a respective annular recess, and an opening in each cover plate through which a braking shaft may be received.

9. A slack adjuster in accordance with claim 8 wherein the diameter of each of said recesses is larger than the diameter of said central opening thereby facilitating the machining process by which said central opening is constructed.

10. A slack adjuster in accordance with claim 8 wherein each of said recesses and each of said cover plates is identically constructed and thereby interchangeable.

11. A slack adjuster in accordance with claim 8 wherein each of said cover plates includes a respective domed portion forming a pocket around said central opening for collecting excess lubricants squeezed outwardly from said slack adjuster.

12. The slack adjuster in accordance with claim 8 wherein each of said cover plates is comprised of a resilient material with a peripheral skirt initially compressible so as to decrease the diameter thereof, whereby when said peripheral skirt is relaxed within its respective recess, the diameter thereof increases sufficiently so that each of said cover plates become seated therein.

13. A manually adjustable brake slack adjuster comprising:
   a slack adjuster body having a main portion provided with a central opening, an intermediate portion and a lever arm portion;
   means provided on the lever arm portion for applying a braking force to the slack adjuster;
   rotatable gear means positioned within said central opening to allow slack within a braking system to be adjusted;
   first cover means on one side of said body portion and having an opening through which a brake shaft may be received;
   second cover means provided on the other side of said main body portion and having an opening through which said brake shaft may be received; and
   at least one of said first and said second cover means being generally deformable, at least in part, so as to be removably securable to its respective side of said main body portion.

14. A manually adjustable brake slack adjuster comprising:
a slack adjuster body having a main portion provided with a central opening, an intermediate portion and a lever arm portion;
means provided on the lever arm portion for applying a braking force to the slack adjuster;
rotatable gear means positioned within said central opening to allow slack within a braking system to be adjusted;
a bore provided in the central portion of said slack adjuster body and intersecting said central opening in the main body portion to provide an access aperture connecting said bore to said central opening;
worm gear means having gear teeth positioned with said bore so that said gear teeth extend through said access aperture, said bore further providing substantial bearing support for said worm gear means to thereby oppose force loads transmitted to said worm gear;
means rotatably mounting said worm gear within said bore;
retaining means restraining axial movement of said worm gear within said bore; and
retractable socket means in said bore on the outer end of said worm gear shaft, said retractable socket means including a key which permits said socket means to be retracted axially on a shaft while simultaneously precluding rotation of said socket means; said bore further including a rim around the outside thereof extending outwardly beyond said retaining means, said rim being deformable over said retaining means to thereby secure said retaining means and thus said socket means within said bore.

15. A slack adjuster in accordance with claim 1 wherein the diameter of each said recess is larger than the diameter of said central opening thereby facilitating the machining process by which said central opening is constructed.

16. A slack adjuster in accordance with claim 1 wherein each said recess is identically-constructed and each said cover plate is identically-constructed and thereby interchangeable.

17. A slack adjuster in accordance with claim 1 wherein each said cover plate includes a domed portion forming a pocket around the central opening for collecting excess lubricant squeezed outwardly from said slack adjuster.

18. The slack adjuster in accordance with claim 2 wherein at least one of said cover plate includes a peripheral skirt initially flared outwardly, and when subjected to an axial compressive force during installation said skirt flares outwardly even more thereby increasing the diameter thereof and becoming fixed within said annular groove.

19. The slack adjuster in accordance with claim 18 wherein said peripheral skirt is flared outwardly about 50° before being subjected to said compressive force.

20. The slack adjuster in accordance with claim 2 wherein at least one of said cover plate is comprised of a resilient material with a peripheral skirt initially compressed so as to decrease the diameter thereof, and when said peripheral skirt is relaxed within its groove the diameter thereof increases sufficiently so that said cover plate becomes seated therein.

21. The improved slack adjuster of claim 2 wherein said cover plate is comprised of a deformable metal whereby when said cover plate is subjected to an axial compressive force said skirt is permanently flared outwardly into said groove.

22. The improved slack adjuster of claim 2 wherein said cover plate is comprised of a resilient spring-like material compressible to a first outside diameter for insallation of said cover plate into said groove, and with a second outside diameter corresponding to an uncompressed relaxed state for seating said cover plate within said groove.

23. The improved slack adjuster of claim 22, or wherein said cover plate is comprised of a nonmetallic material.

24. The improved slack adjuster of claim 23 above in said cover plate is comprised of a plastic-like material.

25. A slack adjuster in accordance with claim 3, further including an annular recess positioned about said central opening, said recess having a rim thereabout extending outwardly beyond the periphery of said cover means, and said rim being deformable over a periphery portion of the cover means to thereby secure said cover means within said recess.

* * * * *

UNITED STATES PATENT AND TRADEMARK OFFICE
CERTIFICATE OF CORRECTION

PATENT NO. : 4,499,978

DATED : February 19, 1985

INVENTOR(S) : Charles E. Norcross

It is certified that error appears in the above-identified patent and that said Letters Patent is hereby corrected as shown below:

In column 3, line 66, please delete "numberal" and substitute therefor --numeral--;

In column 4, line 57, please delete "interfer" and substitute therefor --interfere--;

In column 11, line 56, please delete "for" and substitute therefor --from--;

In column 12, line 12, please delete "cap 27" and substitute therefor --cap 87--;

UNITED STATES PATENT AND TRADEMARK OFFICE
CERTIFICATE OF CORRECTION

PATENT NO. : 4,499,978

DATED : February 19, 1985

INVENTOR(S) : Charles E. Norcross

It is certified that error appears in the above-identified patent and that said Letters Patent is hereby corrected as shown below:

In claim 7 (column 14, line 15), please delete "claim 1" and substitute therefor --claim 6--;

In claim 8 (column 14, line 21), please delete "opening" and substitute therefor --opposing--;

In claim 22 (column 16, line 31), please delete "insallation" and substitute therefor --installation--.

Signed and Sealed this

Fourth Day of November, 1986

[SEAL]

Attest:

DONALD J. QUIGG

Attesting Officer

Commissioner of Patents and Trademarks